(12) United States Patent
Shreevastav et al.

(10) Patent No.: US 11,700,572 B2
(45) Date of Patent: Jul. 11, 2023

(54) LOCATION SERVER ASSISTED MOBILITY EVALUATION FOR POWER LIMITED WIRELESS COMMUNICATION DEVICES

(71) Applicant: Telefonaktiebolaget LM Ericsson (publ), Stockholm (SE)

(72) Inventors: Ritesh Shreevastav, Upplands Väsby (SE); Sara Modarres Razavi, Linköping (SE); Nicklas Johansson, Brokind (SE); Stefan Wänstedt, Luleå (SE); Emre Yavuz, Stockholm (SE); Kazuyoshi Uesaka, Kanagawa (JP); Åke Busin, Sollentuna (SE); Andreas Höglund, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 79 days.

(21) Appl. No.: 17/267,532

(22) PCT Filed: Aug. 12, 2019

(86) PCT No.: PCT/SE2019/050738
§ 371 (c)(1),
(2) Date: Feb. 10, 2021

(87) PCT Pub. No.: WO2020/036525
PCT Pub. Date: Feb. 20, 2020

(65) Prior Publication Data
US 2021/0321321 A1    Oct. 14, 2021

Related U.S. Application Data

(60) Provisional application No. 62/718,181, filed on Aug. 13, 2018.

(51) Int. Cl.
H04W 48/16    (2009.01)
H04W 4/029    (2018.01)
H04W 48/18    (2009.01)

(52) U.S. Cl.
CPC .......... *H04W 48/16* (2013.01); *H04W 4/029* (2018.02); *H04W 48/18* (2013.01)

(58) Field of Classification Search
None
See application file for complete search history.

(56) References Cited

U.S. PATENT DOCUMENTS

2014/0071854 A1* 3/2014 Xiang .................. H04W 48/16
370/254
2015/0282021 A1 10/2015 Pao et al.
(Continued)

FOREIGN PATENT DOCUMENTS

WO    2018064067 A1    4/2018

OTHER PUBLICATIONS

Ericsson, "Inter-RAT idle mode mobility in NB-IoT", 3GPP TSG-RAN2 Meeting #96, R2-168327, Reno, US, Nov. 14-18, 2016, 1-4.
(Continued)

*Primary Examiner* — German Viana Di Prisco
(74) *Attorney, Agent, or Firm* — Murphy, Bilak & Homiller, PLLC

(57) ABSTRACT

A system in which a wireless communication device (e.g. a NB-IoT device) can obtain assistance information from a location server which can help the WCD select the right target RAT. A method performed by a wireless communication device, the method comprising: receiving inter-Radio Access Technology (inter-RAT) assistance information; determining a RAT based on the received inter-RAT assistance information; and utilizing the determined RAT.

25 Claims, 8 Drawing Sheets

(56) References Cited

U.S. PATENT DOCUMENTS

| | | |
|---|---|---|
| 2017/0006528 A1 | 1/2017 | Bari |
| 2018/0098276 A1* | 4/2018 | Livanos ................ H04W 48/08 |
| 2018/0220486 A1 | 8/2018 | Tseng et al. |
| 2019/0268725 A1* | 8/2019 | Edge ..................... H04W 64/00 |
| 2019/0349881 A1* | 11/2019 | Choi ..................... H04W 64/00 |

OTHER PUBLICATIONS

Ericsson, "Introduction of Inter-RAT cell selection indication in 36.304", 3GPP TSG-RAN WG2 #104, R2-1817551, Spokane, USA, Nov. 12-16, 2018, 1-3.

Huawei, "WID revision: Additional enhancements for NB-IoT", 3GPP TSG RAN meeting #81 RP-181674, Gold Coast, Australia, Sep. 10-13, 2018, 1-4.

* cited by examiner

LOCATION SERVER ASSISTED MOBILITY EVALUATION FOR POWER LIMITED WIRELESS COMMUNICATION DEVICES

TECHNICAL FIELD

Disclosed are embodiments related to inter-Radio Access Technology ("inter-RAT") reselection.

BACKGROUND

NB-IoT (Narrow Band-Internet of Things) is a narrowband system being developed for cellular internet of things by 3GPP. The system provides access to network services using physical layer optimized for very low power consumption (e.g. full carrier bandwidth is 180 kHz, subcarrier spacing can be 3.75 kHz or 15 kHz). The system is based on existing LTE systems and addresses optimized network architecture and improved indoor coverage for massive number of wireless communication devices (WCDs) with following characteristics: low throughput (e.g. 2 kbps); low delay sensitivity (e.g., ~10 seconds); low cost (e.g., below 5 dollars); and low power consumption (e.g., battery life of 10 years).

It is envisioned that each cell (~1 km2) in this system will serve several thousand (~50 thousand) WCDs such as sensors, meters, actuators, and alike. To be able to make use of existing spectrum for, e.g. GSM, a fairly narrow bandwidth has been adopted for NB-IoT technology.

Currently, wireless communication devices (e.g. NB-IoT devices) support idle mode mobility; intra-frequency and inter-frequency cell reselection. However, inter-RAT cell reselection is still not supported by conventional NB-IoT devices.

For 3GPP Release 16, there is a new work item (WI) "Rel-16 Enhancements for NB-IoT (NB_IOTenh3)", which includes adding support for inter-RAT cell reselection. Specifically the work item description (WID) states for mobility enhancements: "[s]pecify power efficient NB-IoT mechanism which would assist idle mode inter-RAT cell selection for NB-IoT to and from LTE, LTE-MTC and GERAN."

There could be a deployment scenario where NB-IoT coverage shrinks and, for instance, LTE-M or GERAN (GPRS, GPRS with Power Efficient Operation (PEO), EC-GSM-IoT) coverage is available or vice-versa, thus WCDs which are dual RAT or multi-RAT capable can benefit by discovering and moving to the new RAT.

Positioning in LTE and NB-IoT is supported by the LTE positioning architecture shown in FIG. 1, with direct interactions between a wireless communication device (WCD) 102 (also known as User Equipment (UE)) and a location server 104, e.g. Evolved Serving Mobile Location Center (E-SMLC), via the LTE Positioning Protocol (LPP). Moreover, there are also interactions between the location server 104 and an evolved Node B (eNB) 106 via the LPPa protocol, to some extent supported by interactions between the eNB 106 and the WCD 102 via the Radio Resource Control (RRC) protocol. Also shown in FIG. 1 is an Mobility Management Entity (MME) 108 and a Gateway Mobile Location Center (GMLC) 110.

WCD positioning is recognized as an important feature for LTE and NB-IoT networks due to its potential for massive commercial applications, for example, intelligent transportation, entertainment, industry automation, robotics, remote operation, healthcare, smart parking, among others. Positioning support by Enhanced Cell ID (E-CID) and Observed Time Difference Of Arrival (OTDOA) methods have been specified in Rel-14 for NB-IoT. OTDOA positioning using Rel-14 NPRS RE patterns and sequences are used by NB-IoT devices in RRC_IDLE for positioning estimations.

SUMMARY

The inter-RAT methodology defined in the current standard and literature is for WCDs where power is not the most critical issue. The conventional methods of inter-RAT are based on various configuration related parameters and rely on measurement results on a regular basis before a WCD decides to move to another RAT.

The current NB-IoT device can perform some variation of inter-RAT cell reselection. The current method of NB-IoT device inter-RAT cell reselection involves two simultaneous radios which allow the WCD to measure on two RATs, a first RAT for the RAT the WCD is camping on and a second RAT for the target RAT WCD may connect to. The simultaneous use of the two radios, however, may consume up to twice as much power than necessary.

The conventional methods of performing inter-RAT measurement imply that the WCD has to tune to another frequency to perform inter-RAT measurement, which will rapidly increase battery consumption.

For an NB-IoT device, power is the most critical aspect and requires a solution where battery consumption is at a minimum. A solution in which a network node can facilitate a WCD's inter-RAT decision or identify a target RAT for the WCD is a better alternative compared to the conventional methods of inter-RAT reselection. That is, a good solution for inter-RAT reselection allows a WCD to perform or obtain inter-RAT measurements without significant battery consumption.

In one aspect there is provided a method in which a wireless communication device (e.g. a NB-IoT device) can obtain information from a location server which can help the WCD select the right target RAT.

In some embodiments, a trigger condition may initiate a method for efficient RAT reselection. In some embodiments, the trigger condition occurs when the WCD serving cell RSRP/RSRQ is below a certain configured threshold and when a radio network node (e.g., base station, eNB, gNB) indicates either via broadcast or using dedicated signalling (e.g.: RRC connection release) that location server assisted Inter-RAT is possible. In some embodiments, the trigger condition is augmented by a RAN node (e.g., eNB 106) or an MME 108 (see FIG. 1) based on power requirements of the WCD by including the possibility of a periodic evaluation of which RAT can provide the lowest WCD power even if RSRP is sufficient. Such evaluations may be performed when the WCD attaches to the network and infrequently such that the WCD may conserve power. Another trigger condition may be when conditions change, such as, a traffic profile change, a service configuration change, or a network configuration change.

In some aspects, there is provided a method in which a WCD is able to provide positioning information to a location server. The method includes the WCD sending an inter-RAT assistance request to the location server. The method includes the location server sending a location request to the WCD. The method includes the WCD providing location information to the location server. The method includes the location server determining RAT preferences for the WCD based on at least the received location information. In some embodiments, the location server determines the RAT preferences for the WCD further based on one or more parameters transmitted by a radio node, MME, HSS, or any relevant 5G network function, such as an Access and Mobility Function (AMF), or a Unified Data Management (UDM) function, among others. In some embodiments, the one or more parameters includes WCD traffic profile, RAT/RAN configuration, WCD capabilities, if traffic is UL or DL dominated, Coverage Enhancement level of the WCD, whether the WCD is stationary or mobile, QoS, battery life requirements, etc. The method includes the location server providing inter-RAT assistance information to the WCD. The method includes the WCD determining whether to remain in a current RAT or move to another RAT based on the inter-RAT assistance information.

In some embodiments, the method includes the location server transmitting to the WCD an indication whether the location server supports inter-RAT assistance. In the context of the current disclosure, the term transmitting encompasses sending and/or providing. In some embodiments, the method includes the WCD providing location information with a request for inter-RAT assistance to the location server. The request may be made implicitly or explicitly. In such embodiments, the location server determines the RAT preferences for the WCD based at least on the provided location information. In some embodiments, the method includes the location server providing inter-RAT assistance information to the WCD.

In some aspects, there is provided a method in which the WCD requires both positioning and inter-RAT assistance information from the location server. The method includes the WCD sending a positioning request to the location server. The method includes the location server sending a capability request including inter-RAT capability to the WCD. In some embodiments, the method includes the WCD providing capability information including inter-RAT capability to the location server. In some alternative embodiments, the location server obtains the capability information including the WCD's inter-RAT capability from a network node, such as a HSS. The method includes location server providing positioning assistance information to the WCD. The method includes the WCD performing positioning measurements according to the received positioning assistance information from the location server. The method includes the WCD sending a positioning measurement to the location server. The method includes the location server estimating the position of the WCD. The method includes the location server determining the RAT preferences for the WCD based on the estimated position and feedback from RAN, other NW nodes (e.g. MME, HSS), or any relevant 5G network functions, such as an AMF, Location Management Function (LMF) or a UDM function, among others, which would be based upon parameters such as; WCD traffic profile, RAT/RAN configuration, WCD capabilities, if traffic is UL or DL dominated, Coverage Enhancement level of the WCD, whether the WCD is stationary or mobile, QoS, battery life requirements, etc. The method includes the location server providing inter-RAT assistance information to the WCD, optionally with the positioning information of the WCD. The method includes the WCD deciding whether to remain in the current RAT or move to another preferable RAT based on location server assistance information.

In another aspect, there is provided a method performed by a wireless communication device according to some embodiments. The method includes receiving inter-Radio Access Technology ("inter-RAT") assistance information. The method includes determining a RAT based on the received inter-RAT assistance information. The method includes utilizing the determined RAT. In some embodiments, the inter-RAT information comprises a list of one or more RATs available to the wireless communication device at a current location.

In some embodiments, the list of one or more RATs comprises a first RAT identifier identifying a first RAT available to the wireless communication device at the current location. In some embodiments, the method further includes storing the first RAT identifier together with RAT utilization information for utilizing the first RAT (e.g., information identifying the frequency band on which the first RAT operates) prior to receiving the inter-RAT assistance information (e.g., prior to receiving the assistance information, the wireless communication device stores a data record, such as a row in a table, that contains the first RAT identifier and the RAT utilization information). In some embodiments, the step of utilizing the determined RAT comprises obtaining the stored RAT utilization information associated with the first RAT identifier and using the obtained information to utilize the first RAT (e.g., the wireless communication device uses the first RAT identifier included in the assistance information to retrieve the RAT utilization information from the data record that contains the first RAT identifier).

In some embodiments, the method further includes receiving a first indication, transmitted by a server, indicating that the server is capable of inter-RAT support and transmitting an inter-RAT assistance request to the server. In some embodiments, the method further includes receiving a first indication, transmitted by a RAN node, indicating that the RAN node is capable of inter-RAT support and transmitting an inter-RAT assistance request to the RAN node. In some embodiments, the method further includes transmitting a second indication indicating that the wireless communication device is capable of inter-RAT support.

In some embodiments, the method further includes receiving a request for location information of the wireless communication device, determining the location information of the wireless communication device at the current location, and transmitting the location information.

In some embodiments, the method further includes receiving positioning measurement configurations, obtaining positioning measurements for the current location of the wireless communication device based on the received positioning measurement configurations, and transmitting the obtained positioning measurements.

In another aspect, there is provided a method performed by a server according to some embodiments. The method includes receiving a request for inter-Radio Access Technology ("inter-RAT") assistance for a wireless communication device. The method includes obtaining location information of the wireless communication device. The method includes determining inter-RAT assistance information for the wireless communication device based on the obtained location information. The method includes transmitting the determined inter-RAT assistance information.

In some embodiments, the inter-RAT information comprises a list of one or more RATs available to the wireless communication device at a current location. In some embodiments, the list of one or more RATs comprises a first RAT identifier identifying a first RAT available to the wireless communication device at the current location.

In some embodiments, the method further includes transmitting positioning measurement configurations for the wireless communication device, receiving positioning measurements of the wireless communication device, and determining the current location of the wireless communication device based on the received positioning measurements.

In some embodiments, the method further includes transmitting a request for the location information of the wireless communication device and receiving the location information of the wireless communication device. In some embodiments, the method further includes transmitting an indication indicating that the server is capable of inter-RAT support.

In some embodiments, the step of determining the inter-RAT assistance information for the wireless communication device is further based on one or more parameters transmitted by one of: a radio access node, a Mobility Management Entity ("MME"), a Home Subscription Server ("HSS"), an Access and Mobility Function (AMF), and a Unified Data Management (UDM) function. In some embodiments, the one or more parameters include one or more of: a wireless communication device traffic profile, RAT configuration, Radio Access Network ("RAN") configuration, capabilities of the wireless communication device, an indication of uplink ("UL") or downlink ("DL") traffic dominance, coverage enhancement level of the wireless communication device, an indication of whether the wireless communication device is stationary or mobile, Quality of Service ("QoS"), and battery life requirements.

Some advantages provided by the embodiments for efficient inter-Radio Access Technology ("inter-RAT") reselection disclosed herein include: (1) ensuring that a WCD, e.g. NB-IoT device, has coverage and (2) ensuring that the WCD does not drain its battery in performing inter-RAT measurement and mobility.

BRIEF DESCRIPTION OF THE DRAWINGS

The accompanying drawings, which are incorporated herein and form part of the specification, illustrate various embodiments.

DETAILED DESCRIPTION

Figure 1:
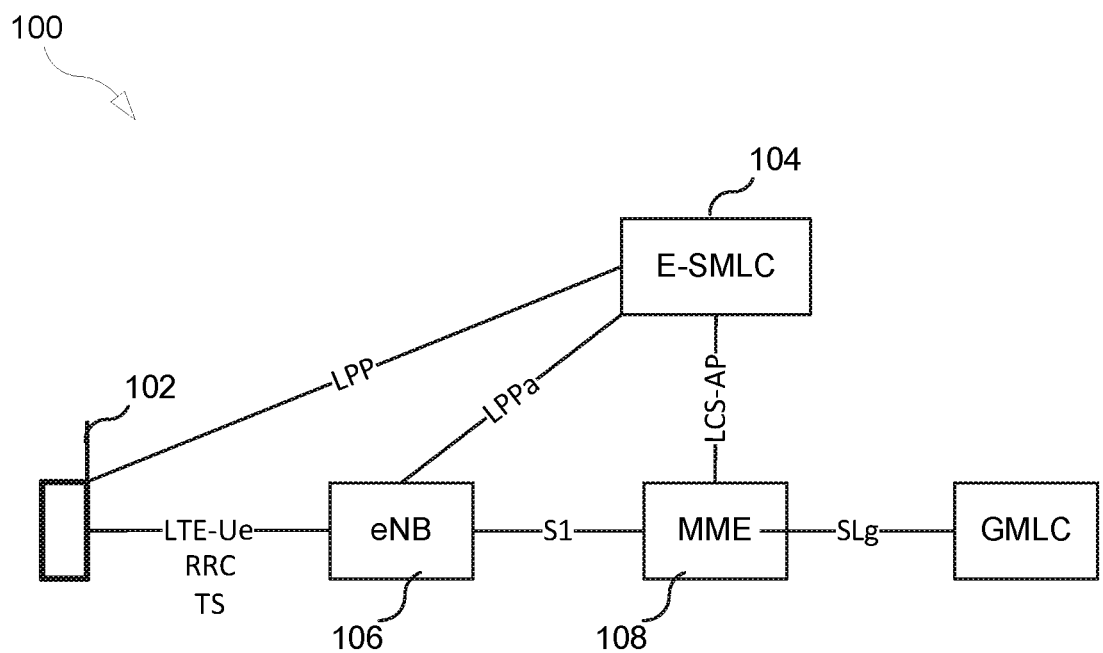
FIG. 1 illustrates LTE positioning architecture according to one embodiment.
Figure 2:
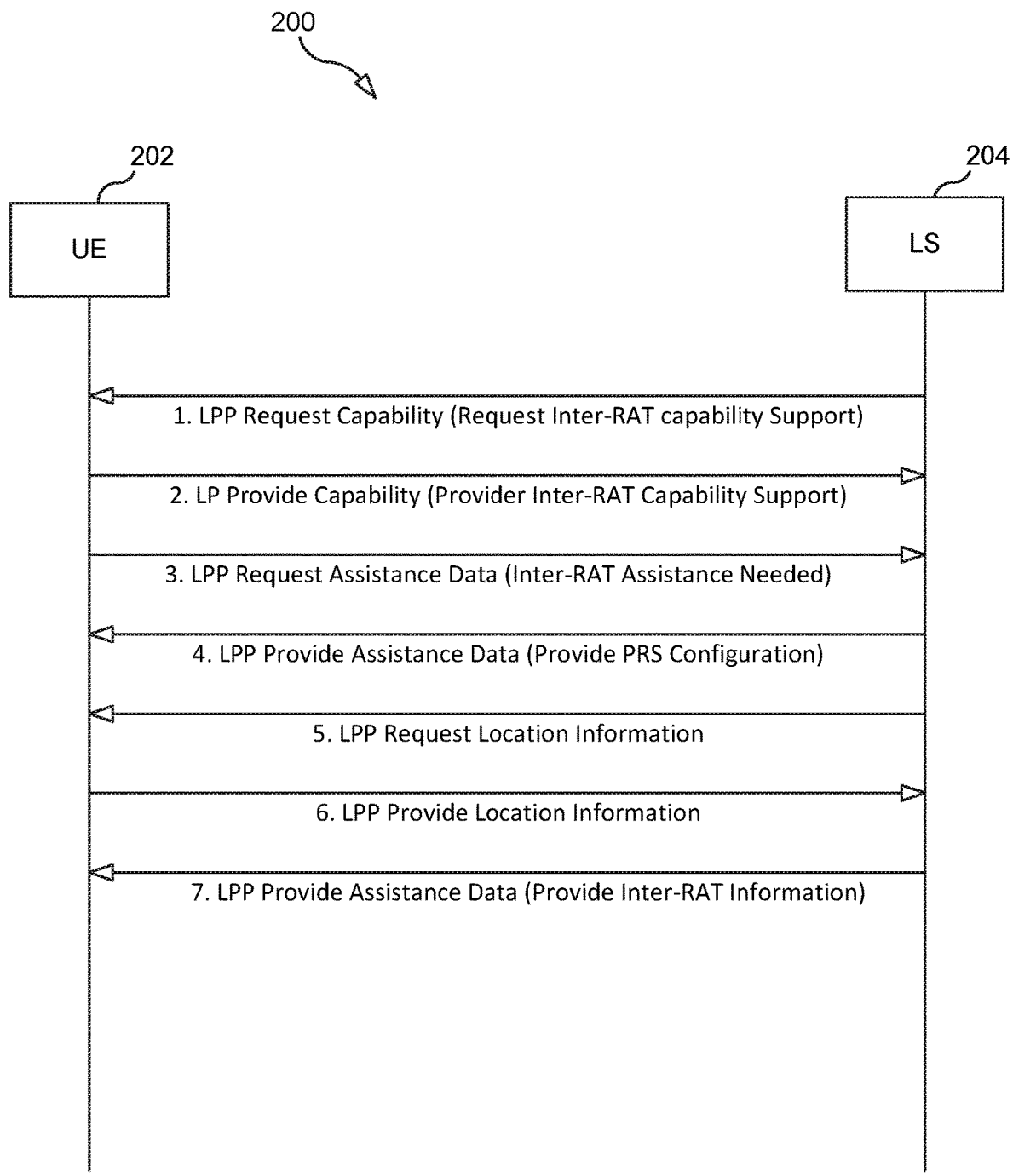
FIG. 2 shows a process according to one embodiment.

FIG. 2 illustrates a message flow 200 between a WCD 202 (also referred to as the WCD 202) and a location server 204 with reference to a LTE positioning protocol ("LPP"). In some embodiments, the message flow 200 may be triggered when a WCD serving cell RSRP/RSRQ is below a certain configured threshold and/or when a network node (e.g. base station, MME, eNB, 5G base station (gNB)) indicates either via broadcast or using dedicated signalling (e.g. RRC connection release) that location server 204 assisted inter-RAT is possible.

As shown in FIG. 2, in step 1, the location server 204 transmits to the WCD 202 a LPP request (e.g. OTDOA-RequestCapabilities) that includes information requesting the WCD to provide an indication of whether the WCD supports inter-RAT capability, according to some embodiments. In some alternative embodiments, the location server 204 transmits the LPP request to a network node, such as a MME or a HSS, such that the WCD may save battery. As discussed above, the location server may perform this step as a result of detecting that a WCD serving cell RSRP/RSRQ is below a certain configured threshold and/or when a network node (e.g. base station, MME, eNB, and gNB) indicates either via broadcast or using dedicated signalling (e.g. RRC connection release) that location server 204 assisted inter-RAT is possible. In some embodiments, the request for inter-RAT capability support comprises an indication that the location server 204 has set the capability for inter-RAT support as "true." In some embodiments, the request for inter-RAT capability support may be implicit and/or explicit in the request for LPP capability.

Table 1 below shows a request for inter-RAT capability support according to one embodiment. In some embodiments, a RAN node can inform the WCD 202, in a broadcast or a RRC connection release, whether the location server 204 is capable of assisted mobility.

TABLE 1

| OTDOA-RequestCapabilities ::= | SEQUENCE { |
|---|---|
| ..., | |
| inter-RAT-Assistance-Support | ENUMERATED {TRUE} OPTIONAL |
| } | |

In step 2, the WCD 202 responds to the location server 204 indicating whether the WCD 202 supports Inter-RAT assistance capability. In some embodiments, the WCD 202 includes the indication of whether the WCD 202 supports Inter-RAT assistance capability in a "LPP Provide Capability" message.

An example of the response is shown in Table 2 below.

TABLE 2

OTDOA-ProvideCapabilities ::= SEQUENCE {
  otdoa-Mode BIT STRING { ue-assisted (0),
    ue-assisted-NB-r14 (1) } (SIZE (1..8)),
  ...,
  supportedBandListEUTRA SEQUENCE (SIZE (1..maxBands)) OF SupportedBandEUTRA OPTIONAL,
  supportedBandListEUTRA-v9a0 SEQUENCE (SIZE (1..maxBands)) OF SupportedBandEUTRA-v9a0

TABLE 2-continued

```
                                           OPTIONAL,
   interFreqRSTDmeasurement-r10         ENUMERATED { supported }    OPTIONAL,
   additionalNeighbourCellInfoList-r10  ENUMERATED { supported }    OPTIONAL,
   prs-id-r14                           ENUMERATED { supported }    OPTIONAL,
   tp-separation-via-muting-r14         ENUMERATED { supported }    OPTIONAL,
   additional-prs-config-r14            ENUMERATED { supported }    OPTIONAL,
   prs-based-tbs-r14                    ENUMERATED { supported }    OPTIONAL,
   additionalPathsReport-r14            ENUMERATED { supported      OPTIONAL,
   densePrsConfig-r14                   ENUMERATED { supported }    OPTIONAL,
   maxSupportedPrsBandwidth-r14         ENUMERATED { n6, n15, n25, n50, n75, n100, ...} OPTIONAL,
   prsOccGroup-r14                      ENUMERATED { supported      OPTIONAL,
   prsFrequencyHopping-r14              ENUMERATED { supported }    OPTIONAL,
   maxSupportedPrsConfigs-r14           ENUMERATED { c2, c3 }       OPTIONAL,
   periodicalReporting-r14              ENUMERATED { supported }    OPTIONAL,
   multiPrbNprs-r14                     ENUMERATED { supported }    OPTIONAL,
   idleStateForMeasurements-r14         ENUMERATED { required }     OPTIONAL,
   numberOfRXantennas-r14               ENUMERATED { rx1, ... }     OPTIONAL,
   inter-RAT-Assistance-r16             ENUMERATED { supported }    OPTIONAL
}
maxBands INTEGER ::= 64
SupportedBandEUTRA ::= SEQUENCE {
   bandEUTRA          INTEGER (1..maxFBI)
}
SupportedBandEUTRA-v9a0 ::= SEQUENCE {
   bandEUTRA-v9a0     INTEGER (maxFBI-Plus1..maxFBI2) OPTIONAL
}
maxFBI             INTEGER ::= 64  -- Maximum value of frequency band indicator
maxFBI-Plus1       INTEGER ::= 65  -- lowest value extended FBI range
maxFBI2            INTEGER ::= 256 -- highest value extended FBI range
```

In some embodiments, the location server 204 may obtain an indication of whether the WCD 202 supports inter-RAT from a RAN (e.g. base station, eNB, gNB). In some embodiments, the location server 204 may obtain the indication regarding inter-RAT support capability for the WCD 202 from an HSS as part of subscription information.

In step 3, the WCD 202 transmits to the location server 204 a message comprising a request for assistance data in order to perform OTDOA Positioning. In some embodiments, the message further comprises an indication that the assistance data is for performing inter-RAT Reference Signal Time Difference (RSTD) measurements.

An example of the request is shown in Table 3 below.

TABLE 3

```
OTDOA-RequestAssistanceData ::= SEQUENCE {
   physCellId INTEGER (0..503),
   ...,
   [[
      adType-r14 BIT STRING { prs (0), nprs (1) } (SIZE (1..8))    OPTIONAL
   ]],
   [[
      inter-RAT-measurmentInfo   ENUMERATED {true}                 OPTIONAL
   ]]
}
```

In step 4, the location server 204 provides positioning reference signal ("PRS") configurations to the WCD 202. In some embodiments, the WCD 202 utilizes the PRS configurations to obtain positioning measurements.

An example of the PRS configuration provided by the location server 204 is shown in Table 4 below:

TABLE 4

```
OTDOA-ProvideAssistanceData ::= SEQUENCE {
   otdoa-ReferenceCellInfo         OTDOA-ReferenceCellInfo           OPTIONAL,  -- Need ON
   otdoa-NeighbourCellInfo         OTDOA-NeighbourCellInfoList       OPTIONAL,  -- Need ON
   otdoa-Error                     OTDOA-Error                       OPTIONAL,  -- Need ON
   ...,
   [[
      otdoa-ReferenceCellInfoNB-r14    OTDOA-ReferenceCellInfoNB-r14      OPTIONAL,  -- Need ON
      otdoa-NeighbourCellInfoNB-r14    OTDOA-NeighbourCellInfoListNB-r14  OPTIONAL   -- Need ON
   ]]
}
```

In step 5, the location server 204 requests location information from the WCD 202. In some embodiments, the location server 204 indicates that the request for the location information is for assisting the WCD 204 in performing inter-RAT reselection as shown in Table 5 below.

TABLE 5

```
OTDOA-RequestLocationInformation ::= SEQUENCE {
    assistanceAvailability      BOOLEAN,
    ...,
    [[
        multipathRSTD-r14       ENUMERATED { requested } OPTIONAL,  -- Need ON
        maxNoOfRSTDmeas-r14     INTEGER (1..32)          OPTIONAL   -- Need ON
    ]],
    [[
        interRAT-r16            ENUMERATED { requested } OPTIONAL,  -- Need ON
    ]]
}
```

In such embodiments, this indication allows the WCD 202 to determine its approximate position for the purpose of inter-RAT reselection rather than determine its precise position as would be necessary for positioning applications such as autonomous driving car positioning estimations. An approximate position is sufficient for the purpose of inter-RAT reselection, which helps the WCD 202 preserve battery.

In step 6, the WCD 202 transmits to the location server 204 a message that includes location information (e.g. measurement information). In some embodiments, the WCD 202 may include in the message a request for inter-RAT assistance information from the location server 204.

An example of the request for location measurements comprising the request for inter-RAT assistance information is shown in Table 6.

TABLE 6

```
OTDOA-ProvideLocationInformation ::=     SEQUENCE {
    otdoaSignalMeasurementInformation        OTDOA-SignalMeasurementInformation       OPTIONAL,
    otdoa-Error                              OTDOA-Error                              OPTIONAL,
    ...,
    [[
        otdoaSignalMeasurementInformation-NB-r14    OTDOA-SignalMeasurementInformation-NB-r14
    OPTIONAL
    ]],
    [[
        interRATAssistanceInformation-NB-r16    InterRATAssistanceInformation-NB-r16    OPTIONAL
    ]]
}
```

In step 7, the location server 204 provides inter-RAT assistance information to the WCD 202. In some embodiments, the location server 204 may include the inter-RAT assistance information in an Information Element ("IE") Inter-RAT-LocationServerAssistance of a message transmitted to the WCD 202. In some embodiments, the inter-RAT assistance information may comprise a list of recommended RATs (also referred to as preferred RATs) for the WCD 202 as shown in Table 7 below.

TABLE 7

```
OTDOA-ProvideAssistanceData ::= SEQUENCE {
    otdoa-ReferenceCellInfo         OTDOA-ReferenceCellInfo          OPTIONAL,   -- Need ON
    otdoa-NeighbourCellInfo         OTDOA-NeighbourCellInfoList      OPTIONAL,   -- Need ON
    otdoa-Error                     OTDOA-Error                      OPTIONAL,   -- Need ON
    ...,
    [[
        otdoa-ReferenceCellInfoNB-r14        OTDOA-ReferenceCellInfoNB-r14        OPTIONAL,   -- Need ON
        otdoa-NeighbourCellInfoNB-r14        OTDOA-NeighbourCellInfoListNB-r14    OPTIONAL    -- Need ON
    ]],
    [[
```

TABLE 7-continued

```
    inter-RAT-LocationServerAssistance        Inter-RAT-LocationServerAssistance    OPTIONAL    -- Need ON
  ]]
}
Inter-RAT-LocationServerAssistance ::= SEQUENCE {
    preferredRATList        PreferredRATList
}
PreferredRATList ::= SEQUNECE (SIZE (1..max-IRAT)) OF PreferredRAT
PreferredRAT ::= ENUMERATED    {        NB-IoT,
                                        LTE-M,
                                        GPRS,
                                        GPRS-PEO,
                                        EC-GSM-ToT,
                                        ...
                                        },
    ...
}
```

In some embodiments, the list of recommended RATs may be in a preferred descending order. In some embodiments, the list of recommended RATs is provided together with a priority indication. In some embodiments, the inter-RAT assistance information may comprise a single RAT.

Inter-RAT measurement needs more battery compared with OTDOA because it requires the WCD 202 to tune RF to another frequency, search for cells, and synch to the network. The purpose of OTDOA in the process 200 described above is to provide approximate position information to trigger the inter-RAT measurement for the WCD 202. For inter-RAT reselection, a precise RSTD measurement is not needed, and thus, there is no need for frequent PRS transmission. In some embodiments, the WCD 202 may need positioning for other purposes. In such embodiments, the inter-RAT measurement can be augmented. For example, city cycle bikes for rental are equipped with NB-IoT devices. Accordingly, these NB-IoT devices can perform positioning at regular interval so that the rental company can locate where the bike is. When NB-IoT devices are performing positioning, the WCDs can also query for inter-RAT assistance or the location server 204 can provide inter-RAT assistance information based on E-CID RSRP/RSRQ fingerprinting.

While process 200 depicted in FIG. 2 is described in relation to the OTDOA positioning method, the inter-RAT assistance information can be provided using other positioning methods (e.g. the E-CID positioning method) in other embodiments.

In some embodiments, the inter-RAT assistance provided by the location server 204 can be considered as an assistance feature of the location server 204. In such embodiments, an approximate position estimation of the WCD 202 is either known at the location server 204 or can be easily retrieved from the WCD 202. This can be either due to the WCD 202 having GNSS support, a network-based E-CID positioning for the WCD 202 at the location server 204, or based on the previously computed position estimation of the WCD 20 by the location server 204 with the assumption or report from the WCD 202 that there has been no movement since the previous report.

In some embodiments, the inter-RAT assistance from the location server 204 can be directly linked with the OTDOA positioning method. While the OTDOA capability request can used by the WCD 202 to report the inter-RAT assistance capability, the location server can provide Inter-RAT assistance after RSTD measurements are received from the WCD 202.

In each of the embodiments disclosed herein, there is a pre-defined map of different RAT-operability in addition to optionally expected coverage level available at the location server 204, in which it is possible to report a list of RATs functioning in the vicinity of the estimated or reported position to the WCD.

The inter-RAT assistance information may have different formats according to some embodiments. In some embodiments, the location server 204 may report only the best RAT coverage at the specified location. In some embodiments, the location server 204 may provide the WCD 202 with a list of RATs available at the specified location. In such embodiments, the list of RATs may further comprise a proper sorting of the RATs, based on the WCD capabilities and network preferences. The inter-RAT assistance information may also comprise expected coverage level (RSRP, RSRQ, Coverage class, etc.) for each of the listed RATs in order to help the WCD to select and search for any given RAT (NB-IoT, LTE-M, GPRS, GRPS-PEO, EC-GSM-IoT, etc.). In the context of the current disclosure, the network preference is mainly to have a balanced load within different RATs of one network, especially given the consideration of massive number of similar devices served by the network.

In some embodiments, RSRP/RSRQ measurements based on PRS can be also used as an input by the location server 204 to decide the best mobility decision for the WCD 202. A pathloss to a neighbor cell of the serving RAT can then be derived from these measurements. This in turn can be used to estimate signal strength of other RATs (and frequencies) by the WCD 202. This can be done for both RATs that have co-sited cells as well as non-co-sited, but with larger errors.

Upon receipt of measurement information, the location server 204 may be configured to perform at least one or more of the following transformations: (1) a first transformation from RF measurement domain (RSTD, RSRP) to geospatial domain and (2) a second transformation from the geospatial domain to RF-quality domain. In some instances, these two transformations may suffer from bad error propagation properties. Accordingly, in some embodiments, the geospatial domain transformation may be bypassed and the RF measurement domain may be transformed to the RF-quality domain. In such embodiments, the bypassing may be realized by various methods of fingerprinting, i.e. collecting a large number of NB-IoT RSRP (serving and neighboring) measurement together with actual RAT quality measurements measured at the same time instance or the same location. In other embodiments, a transformation to a modified intermediate transformation domain other than the geospatial domain, e.g. spatial bins with associated probability of presence, may be provided to enhance the results. The two-way process (intermediate transformation domain step) could be also realized by fingerprinting in which collecting the RSRP vectors are collected together with ground truth (likely GNSS based) in a first step and the measured or predicted RAT-quality could be placed in spatial bins (e.g. 50×50 m) in the second step. Then for a measured RSRP vector the predicted RAT quality and uncertainty could be calculated. Based on the transformation results, the location server 204 is able to perform processing to determine a target RAT for a given NB-IoT RSRP vector.

In some embodiments, the WCD 202 may use the inter-RAT assistance information from the location server 204 differently based on the WCD category or power level. In some embodiments, the WCD 202 may follow what the location server 204 has recommended in the inter-RAT assistance information, e.g. to go to the preferred RAT on the top of the list.

In some embodiments, the WCD 202 may conduct additional rigorous inter-RAT measurements (to evaluate if a target RAT has good quality or not). In such embodiments, the WCD 202 may also obtain feedback from a network node (e.g. RAN, MME, HSS) and combine both the inter-RAT measurements and the feedback to make the final decision regarding which RAT to use.

In some embodiments, a base station (eNB, gNB) may also have some positioning capability, for instance based upon fingerprinting from received RSRP/RSRQ. In such embodiments, the inter-RAT assistance information may also be provided by the base station using RRC protocol to the WCD 202.

Figure 3:
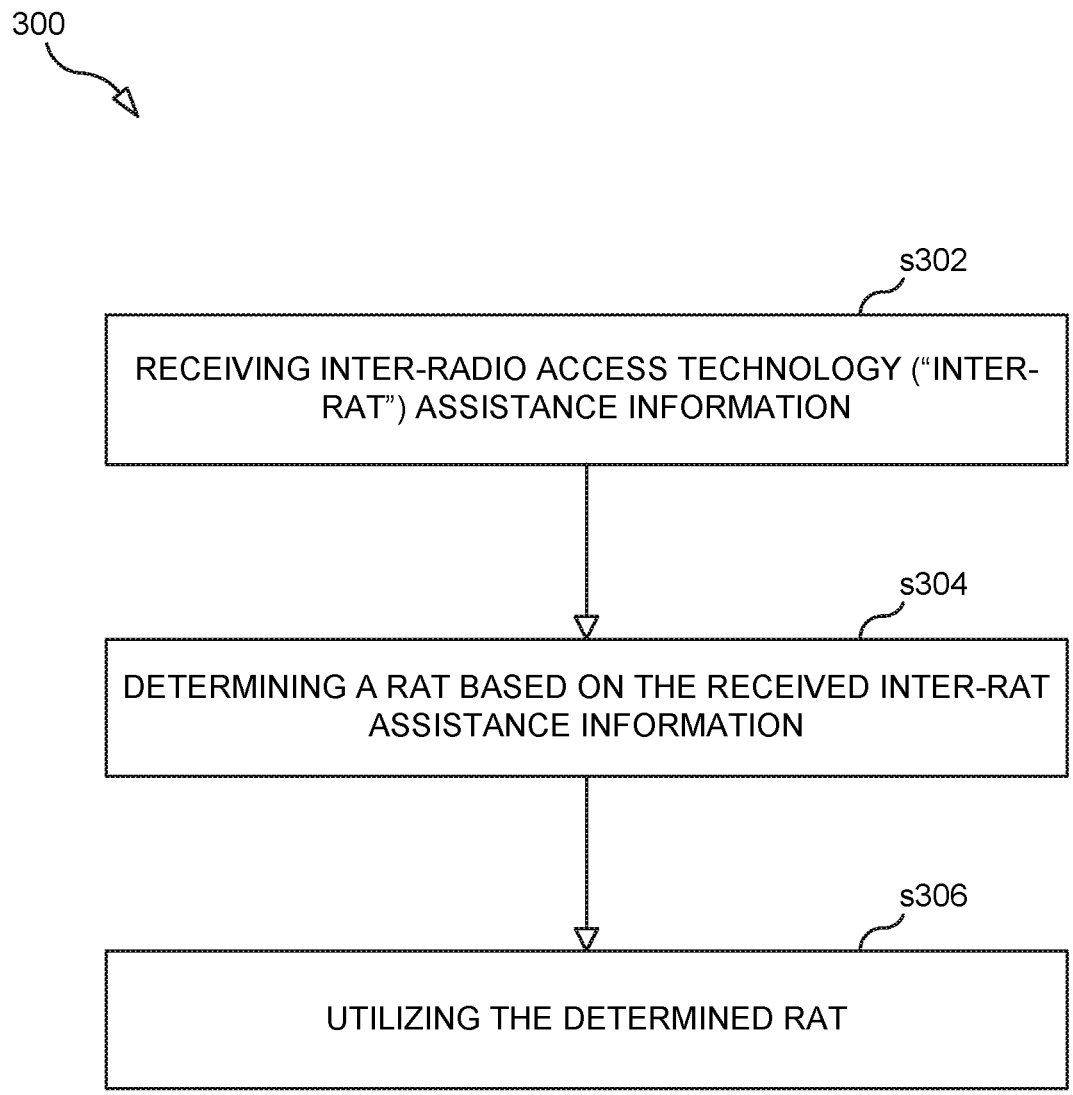
FIG. 3 is a flow chart illustrating a process according to one embodiment.

FIG. 3 is a flow chart illustrating a process 1000 performed by a wireless communication device according to some embodiments. Process 1000 may begin with step s302 in which the wireless communication device receives inter-Radio Access Technology ("inter-RAT") assistance information. In step s304, the wireless communication device determines a RAT based on the received inter-RAT assistance information. In step s306, the wireless communication device utilizes the determined RAT. In some embodiments, the inter-RAT information comprises a list of one or more RATs available to the wireless communication device at a current location.

In some embodiments, the list of one or more RATs comprises a first RAT identifier identifying a first RAT available to the wireless communication device at the current location. In some embodiments, the process 1000 includes a further step in which the wireless communication device stores the first RAT identifier together with RAT utilization information for utilizing the first RAT (e.g., information identifying the frequency band on which the first RAT operates) prior to receiving the inter-RAT assistance information (e.g., prior to receiving the assistance information, the wireless communication device stores a data record, such as a row in a table, that contains the first RAT identifier and the RAT utilization information). In some embodiments, the step of utilizing the determined RAT comprises obtaining the stored RAT utilization information associated with the first RAT identifier and using the obtained information to utilize the first RAT (e.g., the wireless communication device uses the first RAT identifier included in the assistance information to retrieve the RAT utilization information from the data record that contains the first RAT identifier).

The context here has been described for NB-IoT Inter-RAT Mobility Procedure. Other mobility related assistance (e.g. intra or inter-frequency cell reselection and handovers) information can be also supported and/or provided in some embodiments. Further, this can be used for any other cellular devices and technology such as GSM, GPRS, EC-GSM, LTE, NR etc. where power saving mechanism is required and positioning of the devices is required to be done frequently.

In some embodiments, the process 1000 includes a further step in which the wireless communication device receives a first indication, transmitted by a server, indicating that the server is capable of inter-RAT support and transmits an inter-RAT assistance request to the server. In some embodiments, the process 1000 includes a further step in which the wireless communication device transmits a second indication indicating that the wireless communication device is capable of inter-RAT support.

In some embodiments, the process 1000 includes a further step in which the wireless communication device receives a request for location information of the wireless communication device, determines the location information of the wireless communication device at the current location, and transmits the location information.

In some embodiments, the process 1000 includes a further step in which the wireless communication device receives positioning measurement configurations, obtains positioning measurements for the current location of the wireless communication device based on the received positioning measurement configurations, and transmits the obtained positioning measurements.

Figure 4:
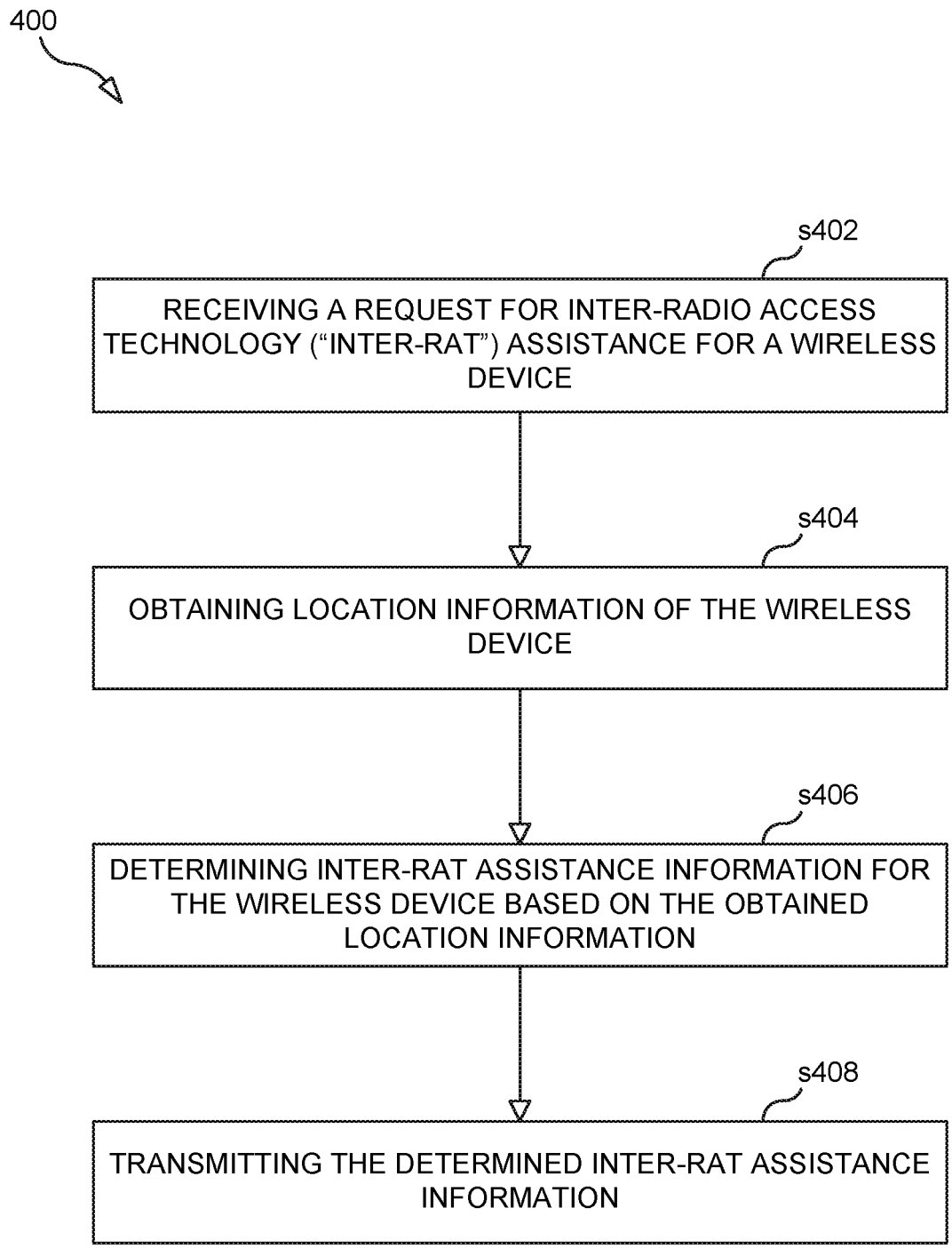
FIG. 4 is a flow chart illustrating a process according to one embodiment.

FIG. 4 is a flow chart illustrating a process 1100 performed by a server according to some embodiments. Process 1100 may begin with step s402 in which the server receives a request for inter-Radio Access Technology ("inter-RAT") assistance for a wireless communication device. In step s404, the server obtains location information of the wireless communication device. In step s406, the server determines inter-RAT assistance information for the wireless communication device based on the obtained location information. In step s408, the server transmits the determined inter-RAT assistance information.

In some embodiments, the inter-RAT information comprises a list of one or more RATs available to the wireless communication device at a current location. In some embodiments, the list of one or more RATs comprises a first RAT identifier identifying a first RAT available to the wireless communication device at the current location.

In some embodiments, the process 1100 includes a further step in which the server transmits positioning measurement configurations for the wireless communication device, receives positioning measurements of the wireless communication device, and determines the current location of the wireless communication device based on the received positioning measurements.

In some embodiments, the process 1100 includes a further step in which the server transmits a request for the location information of the wireless communication device and receives the location information of the wireless communication device. In some embodiments, the process 1100 includes a further step in which the server transmits an indication indicating that the server is capable of inter-RAT support.

In some embodiments, the step of determining the inter-RAT assistance information for the wireless communication device is further based on one or more parameters transmitted by one of: a radio access node, a Mobility Management Entity ("MME"), a Home Subscription Server ("HSS"), an Access and Mobility Function (AMF), and a Unified Data Management (UDM) function. In some embodiments, the one or more parameters include one or more of: a wireless communication device traffic profile, RAT configuration, Radio Access Network ("RAN") configuration, capabilities of the wireless communication device, an indication of uplink ("UL") or downlink ("DL") traffic dominance, coverage enhancement level of the wireless communication device, an indication of whether the wireless communication device is stationary or mobile, Quality of Service ("QoS"), and battery life requirements.

Figure 5:
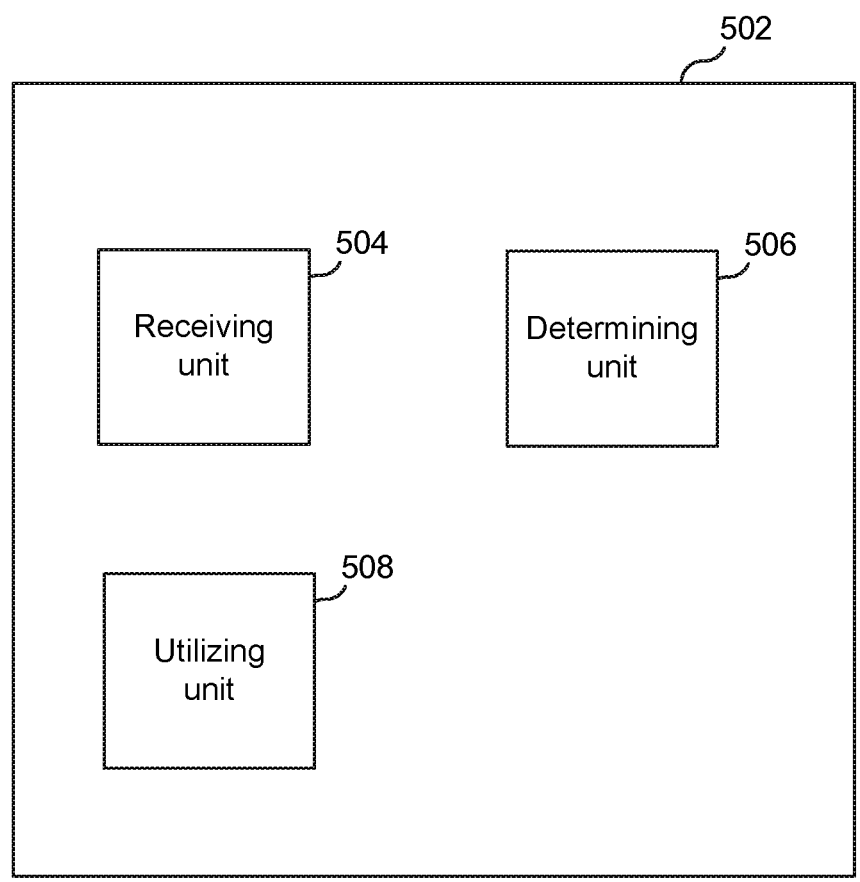
FIG. 5 is a diagram showing functional units of a wireless communication device according to one embodiment.

FIG. 5 is a diagram showing functional units of a wireless communication device 502. In some embodiments, the wireless communication device 502 is the WCD 202 described above with reference to FIG. 2. The wireless communication device 502 includes a receiving unit 504 for receiving inter-Radio Access Technology ("inter-RAT") assistance information; a determining unit 506 for determining a RAT based on the received inter-RAT assistance information; and a utilizing unit 508 for utilizing the determined RAT.

Figure 6:
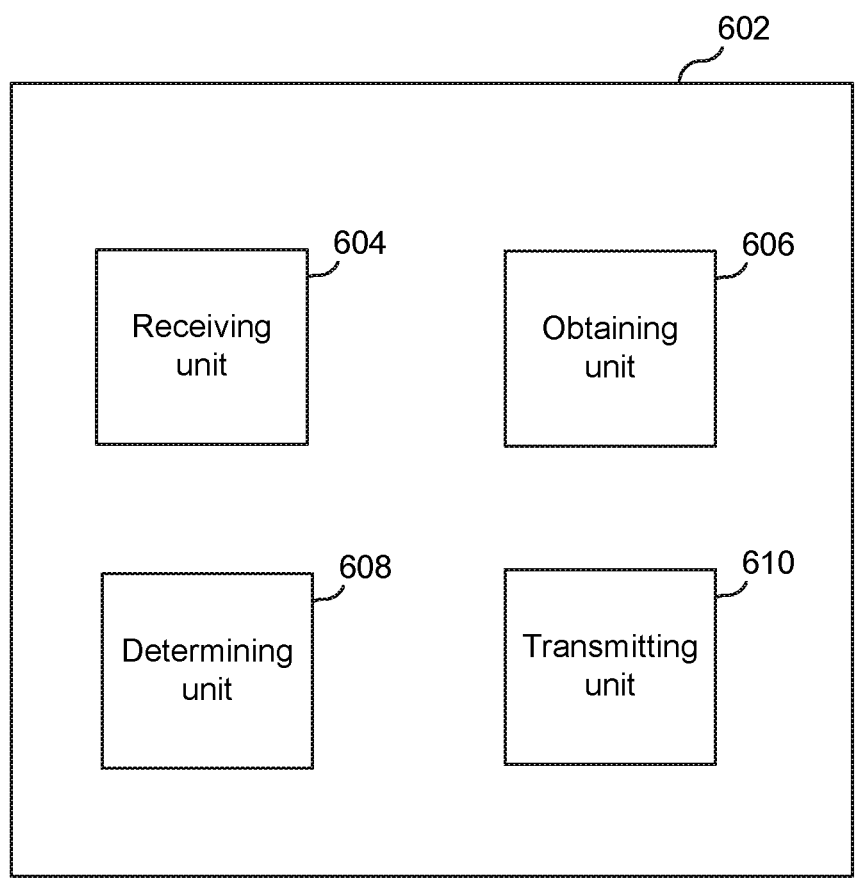
FIG. 6 is a diagram showing functional units of a server according to one embodiment.

FIG. 6 is a diagram showing functional units of a server 602. In some embodiments, the server 602 is the location server 204 described above with reference to FIG. 2. The server 602 includes a receiving unit 604 for receiving a request for inter-Radio Access Technology ("inter-RAT") assistance for a wireless communication device; an obtaining unit 606 for obtaining location information of the wireless communication device; a determining unit 608 for determining inter-RAT assistance information for the wireless communication device based on the obtained location information; and a transmitting unit 610 for transmitting the determined inter-RAT assistance information.

Figure 7:
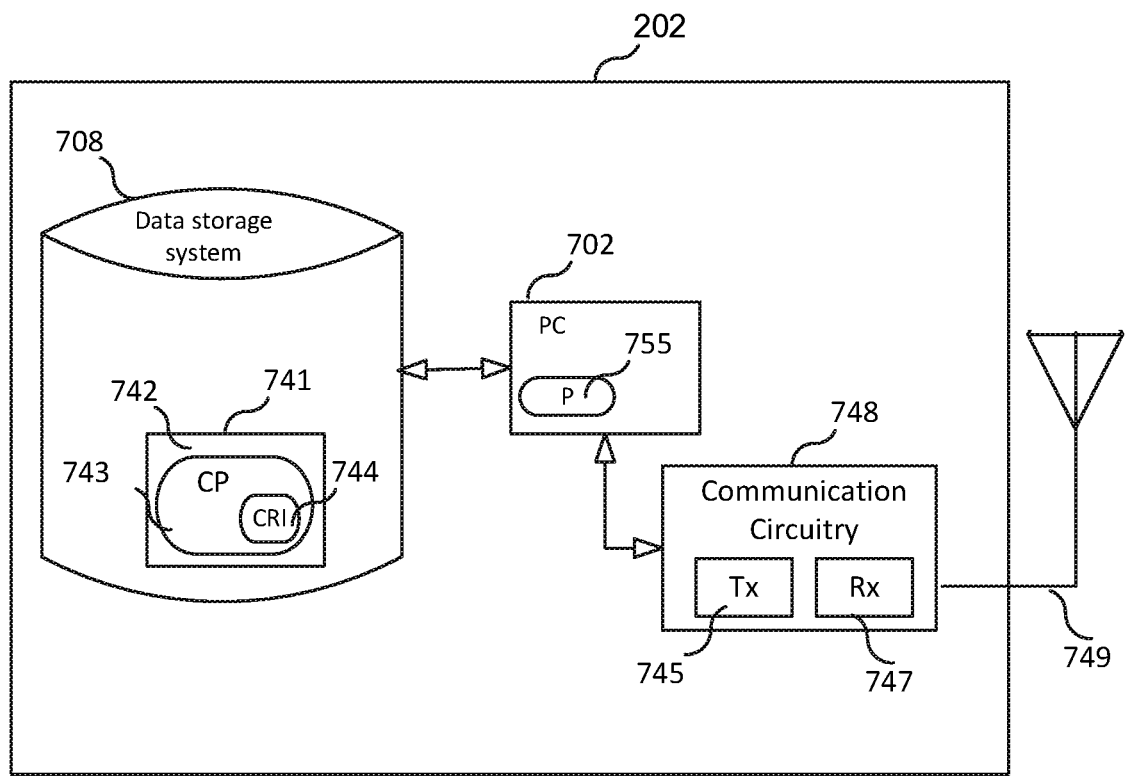
FIG. 7 is a block diagram of a wireless communication device according to one embodiment.

FIG. 7 is a block diagram of a wireless communication device 202 according to one embodiment. As shown in FIG. 7, wireless communication device 202 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, which is coupled to an antenna arrangement 749 comprising one or more antennas and which comprises a transmitter (Tx) 745 and a receiver (Rx) 747 for enabling WCD 202 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes WCD 202 to perform steps described herein (e.g., steps described herein with reference to the flow charts). In other embodiments, WCD 202 may be configured to perform steps described herein without the need for code. That is, for example, PC 702 may consist merely of one or more ASICs. Hence, the features of the embodiments described herein may be implemented in hardware and/or software.

Figure 8:
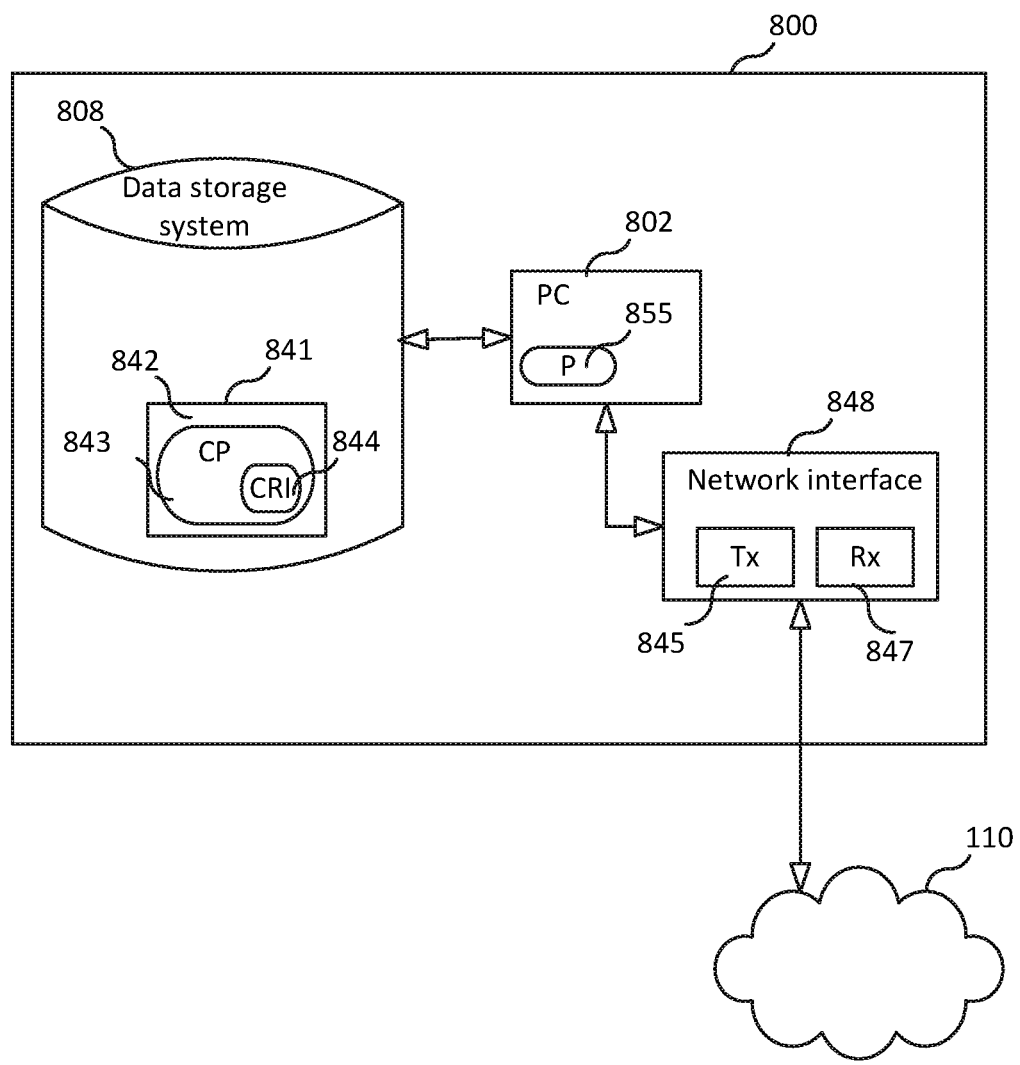
FIG. 8 is a block diagram of a server according to one embodiment.

FIG. 8 is a block diagram of a server 800 according to one embodiment. In some embodiments, the server 800 is the location server 204 described above with reference to FIG. 2. As shown in FIG. 8, server 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling server 800 to transmit data to and receive data from other nodes connected to a network 110 (e.g., an Internet Protocol (IP) network) to which network interface 848 is connected; and a local storage unit (a.k.a., "data storage system") 808, which may include one or more non-volatile storage devices and/or one or more volatile storage devices. In embodiments where PC 1402 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes server 800 to perform steps described herein (e.g., steps described herein with reference to the flow charts). In other embodiments, server 800 may be configured to perform steps described herein without the need for code. That is, for example, PC 802 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a wireless communication device for determining a suitable Radio Access Technology (RAT), the method comprising:
    receiving a first indication, transmitted by a network node, indicating that the network node is capable of inter-RAT support, wherein the network node is one of a server and a radio access node;
    transmitting an inter-RAT assistance request to the network node;
    receiving a request for location information of the wireless communication device;
    determining the location information of the wireless communication device at a current location of the wireless communication device;
    transmitting the location information;
    receiving inter-RAT assistance information;
    determining a RAT based on the received inter-RAT assistance information; and
    utilizing the determined RAT.

2. The method of claim 1, wherein the inter-RAT assistance information comprises a list of one or more RATs available to the wireless communication device at the current location of the wireless communication device.

3. The method of claim 1, the method further comprising transmitting a second indication indicating that the wireless communication device is capable of inter-RAT support.

4. A method performed by a server, the method comprising:
receiving a request for inter-Radio Access Technology (inter-RAT) assistance for a wireless communication device;
obtaining location information of the wireless communication device;
determining inter-RAT assistance information for the wireless communication device based on the obtained location information; and
transmitting the determined inter-RAT assistance information.

5. The method of claim 4, wherein the inter-RAT assistance information comprises a list of one or more RATs available to the wireless communication device at a current location of the wireless communication device.

6. The method of claim 4, wherein obtaining the location information of the wireless communication device comprises:
transmitting positioning measurement configurations for the wireless communication device, receiving positioning measurements of the wireless communication device, and determining the current location of the wireless communication device based on the received positioning measurements; or
transmitting a request for the location information of the wireless communication device and receiving the location information of the wireless communication device in response to the request.

7. The method of claim 4, wherein
the method further comprises the server receiving a message comprising information for use in determining the inter-RAT assistance information, wherein the message was transmitted by one of: a radio access node, a Mobility Management Entity, a Home Subscription Server, an Access and Mobility Function, or a Unified Data Management function, and
the inter-RAT assistance information for the wireless communication device is determined based not only on the obtained location information, but also on the received information, and
the received information comprises at least: a wireless communication device traffic profile, RAT configuration information, Radio Access Network (RAN) configuration information, information specifying a capability of the wireless communication device, an indication of uplink or downlink traffic dominance, information indicating a coverage enhancement level of the wireless communication device, an indication of whether the wireless communication device is stationary or mobile, quality of service information, or information specifying battery life requirements for the wireless communication device.

8. The method of claim 4, wherein
the method further comprises the server receiving a message comprising information for use in determining the inter-RAT assistance information, wherein the message was transmitted by one of: a radio access node, a Mobility Management Entity, a location server, an Access and Mobility Function, or a Location Management Function, and
the inter-RAT assistance information for the wireless communication device is determined based not only on the obtained location information, but also on the received information, and
the received information comprises at least: a recommendation to the wireless communication device to perform a switch to a different cell, frequency, or RAT, RAT configuration information, Radio Access Network configuration information, information ranking of a set of RATs, an indication of expected signal strength in different RATs, RAT capability information, coverage enhancement level and energy consumption of different RATs.

9. The method of claim 4, further comprising transmitting an indication indicating that the server is capable of inter-RAT support.

10. A wireless communication device, the wireless communication device comprising:
communication circuitry; and
processing circuitry configured to:
receive a first indication, transmitted by a network node, indicating that the network node is capable of inter-Radio Access Technology (inter-RAT) support, wherein the network node is one of a server and a radio access node;
transmit an inter-RAT assistance request to the network node;
receive a request for location information of the wireless communication device;
determine the location information of the wireless communication device at a current location of the wireless communication device;
transmit the location information;
receive inter-RAT assistance information;
determine a RAT based on the received inter-RAT assistance information; and
utilize the determined RAT.

11. The wireless communication device of claim 10, wherein the inter-RAT assistance information comprises a list of one or more RATs available to the wireless communication device at the current location of the wireless communication device.

12. The wireless communication device of claim 11, wherein the list of one or more RATs comprises a first RAT identifier identifying a first RAT available to the wireless communication device at the current location of the wireless communication device, wherein the processing circuitry is further configured to, prior to receiving the inter-RAT assistance information, store the first RAT identifier together with RAT utilization information for utilizing the first RAT.

13. The wireless communication device of claim 10, wherein the processing circuitry is further configured to transmit a second indication indicating that the wireless communication device is capable of inter-RAT support.

14. The wireless communication device of claim 10, wherein the processing circuitry is further configured to:
receive positioning measurement configurations;
obtain positioning measurements for the current location of the wireless communication device based on the received positioning measurement configurations; and
transmit the obtained positioning measurements.

15. The wireless communication device of claim 10, wherein the request for location information indicates that the request for the location information is for assisting the wireless communication device in performing inter-RAT reselection, and wherein the processing circuitry is further configured to, based on the request for location information indicating that the request for the location information is for assisting the wireless communication device in performing inter-RAT reselection, select a type of positioning method to use for determining the location information of the wireless communication device, from among multiple types of positioning methods supported by the wireless communication device.

16. The wireless communication device of claim 15, wherein the processing circuitry is configured to, based on the request for location information indicating that the request for the location information is for assisting the wireless communication device in performing inter-RAT reselection, select a first type of positioning method to use for determining the location information of the wireless communication device, over a second type of positioning method, wherein the first type of positioning method is less precise than the second type of positioning method.

17. The wireless communication device of claim 10, wherein the processing circuitry is configured to determine the RAT to utilize based on the received inter-RAT assistance information, without tuning to another frequency to perform an inter-RAT measurement and/or without independently assessing which RAT is a best RAT to utilize.

18. The wireless communication device of claim 10, the wireless communication device is a narrowband internet of things (NB-IoT) device that is multi-RAT capable, and wherein the first indication is a boolean flag indicating that the network node is capable of inter-RAT support.

19. A server comprising:
a network interface; and
processing circuitry configured to:
 receive a request for inter-Radio Access Technology, inter-RAT, assistance for a wireless communication device;
 obtain location information of the wireless communication device;
 determine inter-RAT assistance information for the wireless communication device based on the obtained location information; and
 transmit the determined inter-RAT assistance information.

20. The server of claim 19, wherein the inter-RAT assistance information comprises a list of one or more RATs available to the wireless communication device at a current location.

21. The server of claim 19, the processing circuitry configured to obtain the location information of the wireless communication device by:
 transmitting positioning measurement configurations for the wireless communication device, receiving positioning measurements of the wireless communication device, and determining the current location of the wireless communication device based on the received positioning measurements; or
 transmitting a request for the location information of the wireless communication device and receiving the location information of the wireless communication device in response to the request.

22. The server of claim 19, wherein
the processing circuitry is further configured to receive a message comprising information for use in determining the inter-RAT assistance information, wherein the message was transmitted by one of: a radio access node, a Mobility Management Entity, a Home Subscription Server, an Access and Mobility Function, or a Unified Data Management function, and
the inter-RAT assistance information for the wireless communication device is determined based not only on the obtained location information, but also the received information, and
the received information comprises at least: a wireless communication device traffic profile, RAT configuration information, Radio Access Network (RAN) configuration information, information specifying a capability of the wireless communication device, an indication of uplink or downlink traffic dominance, information indicating a coverage enhancement level of the wireless communication device, an indication of whether the wireless communication device is stationary or mobile, quality of service information, or information specifying battery life requirements for the wireless communication device.

23. The server of claim 19, wherein
the processing circuitry is further configured receive a message comprising information for use in determining the inter-RAT assistance information, wherein the message was transmitted by one of: a radio access node, a Mobility Management Entity, a location server, an Access and Mobility Function, or a Location Management Function, and
the inter-RAT assistance information for the wireless communication device is determined based not only on the obtained location information, but also the received information, and
the received information comprises at least: a recommendation to the wireless communication device to perform a switch to a different cell, frequency or RAT, RAT configuration information, Radio Access Network configuration information, information ranking of a set RATs, an indication of expected signal strength in different RATs, RAT capability information, coverage enhancement level and energy consumption of different RATs.

24. The server of claim 19, the processing circuitry further configured to transmit an indication indicating that the server is capable of inter-RAT support.

25. The server of claim 19, wherein the processing circuitry is further configured to transmit a request for the location information of the wireless communication device and receive the location information of the wireless communication device in response to the request, wherein the request indicates that the request is for assisting the wireless communication device in performing inter-RAT reselection.

* * * * *